US012545099B2

(12) United States Patent
Valente et al.

(10) Patent No.: US 12,545,099 B2
(45) Date of Patent: Feb. 10, 2026

(54) DISCONNECTING ELECTRIC DRIVE UNIT

(71) Applicant: AMERICAN AXLE & MANUFACTURING, INC., Detroit, MI (US)

(72) Inventors: Paul J. Valente, Berkley, MI (US); Joseph S. Balenda, II, Grand Blanc, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 287 days.

(21) Appl. No.: 18/368,149

(22) Filed: Sep. 14, 2023

(65) Prior Publication Data
US 2024/0001749 A1  Jan. 4, 2024

Related U.S. Application Data

(63) Continuation of application No. PCT/US2022/020295, filed on Mar. 15, 2022.
(Continued)

(51) Int. Cl.
*B60K 17/16* (2006.01)
*B60K 1/00* (2006.01)
(Continued)

(52) U.S. Cl.
CPC ........ *B60K 17/16* (2013.01); *B60K 2001/001* (2013.01); *B60K 23/08* (2013.01);
(Continued)

(58) Field of Classification Search
CPC ...... B60K 1/00; B60K 1/02; B60K 2001/001; B60K 23/08; B60K 2023/085–0891;
(Continued)

(56) References Cited

U.S. PATENT DOCUMENTS 7,717,010 B2 * 5/2010 Bar ................. F16H 63/304
74/335
10,012,300 B2 * 7/2018 Valente ................ F16H 48/24
(Continued)

FOREIGN PATENT DOCUMENTS

| DE | 102018218536 A1 | 4/2020 |
| DE | 102019203212 A1 | 9/2020 |
| KR | 20010051063 A | 6/2001 |

OTHER PUBLICATIONS

International Search Report & Written Opinion dated Jun. 30, 2022 for priority PCT App. No. PCT/US2022/020295 filed Mar. 15, 2022.
(Continued)

*Primary Examiner* — James J Taylor, II
(74) *Attorney, Agent, or Firm* — DICKINSON WRIGHT PLLC

(57) ABSTRACT

An electric drive unit having a disconnecting differential a multi-phase electric motor and an inverter that controls power to the electric motor. The inverter has an inverter mount, a plurality of power semiconductors that are mounted to the inverter mount, and a plurality of busbars. Each of the busbars has first and second busbar portions, each having a body and a plurality of fingers. The fingers on the first and second busbar portions are mechanically and electrically coupled to opposite sides of terminals on corresponding ones of the power semiconductors.

13 Claims, 8 Drawing Sheets

Related U.S. Application Data

(60) Provisional application No. 63/161,608, filed on Mar. 16, 2021.

(51) Int. Cl.
*B60K 23/08* (2006.01)
*F16H 48/24* (2006.01)
*F16H 48/34* (2012.01)

(52) U.S. Cl.
CPC ...... *B60K 2023/0858* (2013.01); *F16H 48/24* (2013.01); *F16H 2048/343* (2013.01)

(58) Field of Classification Search
CPC ............ B60K 17/16–165; B60K 17/20; H02K 7/006; H02K 7/116; B60L 15/007; B60L 15/2036; F16H 2200/0021; F16H 48/24; F16H 37/08–37/0826; B60Y 2200/91
See application file for complete search history.

(56) References Cited

U.S. PATENT DOCUMENTS

| | | | |
|---|---|---|---|
| 10,391,861 B2 * | 8/2019 | Richards | F16H 48/38 |
| 10,663,052 B2 | 5/2020 | Balenda, II | |
| 10,920,866 B2 * | 2/2021 | Gostin, Jr. | B60K 23/0808 |
| 11,353,098 B2 * | 6/2022 | Chemelli | F16H 48/24 |
| 12,240,321 B2 * | 3/2025 | Milacic | F16H 48/40 |
| 2004/0163916 A1 | 8/2004 | Showalter | |
| 2012/0277051 A1 | 11/2012 | Cooper et al. | |
| 2014/0378263 A1 | 12/2014 | Hayes et al. | |
| 2016/0131240 A1 | 5/2016 | Cooper | |
| 2016/0160981 A1 | 6/2016 | Balenda, II | |

OTHER PUBLICATIONS

Extended European Search Report for European Patent Application No. 22772016.6 dated Oct. 23, 2024 (14 pages).

* cited by examiner

DISCONNECTING ELECTRIC DRIVE UNIT

CROSS-REFERENCE TO RELATED APPLICATIONS

This application is a by-pass continuation of International Patent Application No. PCT/US2022/020295 filed Mar. 15, 2022, which claims the benefit of U.S. Provisional Patent Application No. 63/161,608 filed Mar. 16, 2021, the disclosure of which is incorporated by reference as if fully set forth in detail herein.

FIELD

The present disclosure relates to a disconnecting electric drive unit.

BACKGROUND

This section provides background information related to the present disclosure which is not necessarily prior art.

While there is increasing interest in the electrification of vehicle drivelines, there are significant issues that must be overcome before vehicles with electrified drivelines substantially displace vehicle drivelines that are powered solely by internal combustion engines. Some of these issues include the cost of the electrified driveline, the volume of the electrified driveline and its ability to be packaged into available space within a vehicle, as well as the robustness of the electronics that are employed to operate and control the electrified driveline.

SUMMARY

This section provides a general summary of the disclosure, and is not a comprehensive disclosure of its full scope or all of its features.

In one form, the present disclosure provides as electric drive unit that includes a housing, an electric motor, a transmission, a differential assembly, a plurality of pins, first and second axle shafts, an actuation flange and an actuator. The electric motor is received in the housing and includes a motor output shaft. The transmission is received in the housing and includes a transmission input gear, which is coupled to the motor output shaft for rotation therewith, and a transmission output gear that is rotatable about an output axis. The differential assembly is received in the housing and includes a differential case, a differential gearset, and first and second differential output members. The differential case is coupled to the transmission output gear for rotation therewith about the output axis. The differential case defines an annular shoulder through which a plurality of circumferentially spaced-apart apertures are formed. The differential gearset has a plurality of differential pinions, which are coupled to the differential case for rotation therewith, and first and second side gears that are drivingly engaged with the differential pinions and rotatable about the output axis relative to the differential case. The first differential output member is coupled to the first side gear for rotation therewith. The second differential output member is rotatable relative to the second side gear about the output axis. The second differential output member is movable along the output axis between a first position, in which the second differential output member is rotationally decoupled from the second side gear, and a second position in which the second differential output member is rotationally coupled to the second side gear. Each of the pins is received in an associated one of the pin apertures such that a first axial end of each of the pins abuts the second differential output member and a second, opposite axial end of each of the pins extends outwardly of the differential case from the annular shoulder. The first axle shaft is coupled for rotation with the first differential output member. The second axle shaft coupled for rotation with the second differential output member. The actuation flange is received onto the differential case and has a first annular flange member that abuts the second axial ends of the pins. The actuator is configured to move the actuation flange along the output axis and includes an actuator fork that engages the actuation flange.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
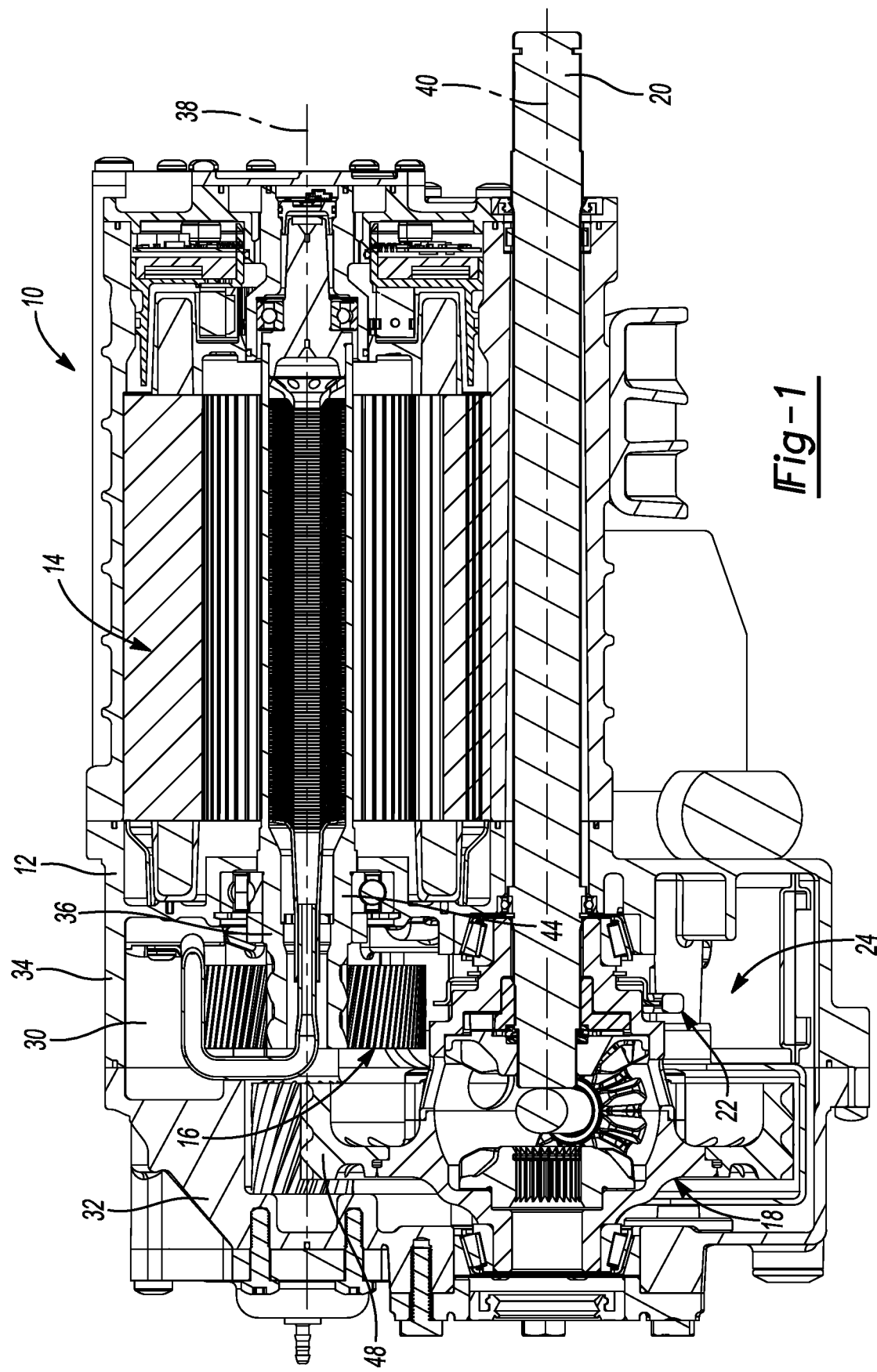
FIG. 1 is a section view of an exemplary electric drive unit constructed in accordance with the teachings of the present disclosure.

With reference to FIG. 1, an exemplary electric drive unit constructed in accordance with the teachings of the present disclosure is generally indicated by reference numeral 10. The electric drive unit 10 includes a housing 12, an electric motor 14, a transmission 16, a differential assembly 18, a pair of axle shafts 20 (only one shown), a disconnect mechanism 22 and a disconnect actuator 24.

The housing 12 can define an internal cavity 30 in which the transmission 16, the differential assembly 18, the disconnect mechanism 22 and the disconnect actuator 24 can be housed. In the example provided, the housing 12 is formed by several housing members, including first and second housing members 32 and 34, that are assembled to one another. The electric motor 14 can be mounted to the housing 12 and can have a motor output shaft 36 that can extend into the internal cavity 30. In the example provided, the motor output shaft 36 is driven about a motor axis 38 that is offset from and parallel to an output axis 40 about which the differential assembly 18 is rotatable. It will be appreciated, however, that the motor axis 38 could be oriented differently from that which is shown here. For example, the motor axis 38 could be transverse to or coaxial with the output axis 40.

The transmission 16 can be configured to provide one or more gear reductions between the motor output shaft 36 and the differential assembly 18. In the particular example provided, the transmission 16 includes a pair of fixed gear reductions (not specifically shown) between a transmission input gear 44, which is coupled to the motor output shaft 36 for rotation therewith, and a transmission output gear 48. It will be appreciated, however, that the transmission 16 could be configured as a multi-speed transmission or as a continuously variable transmission.

Figure 2:
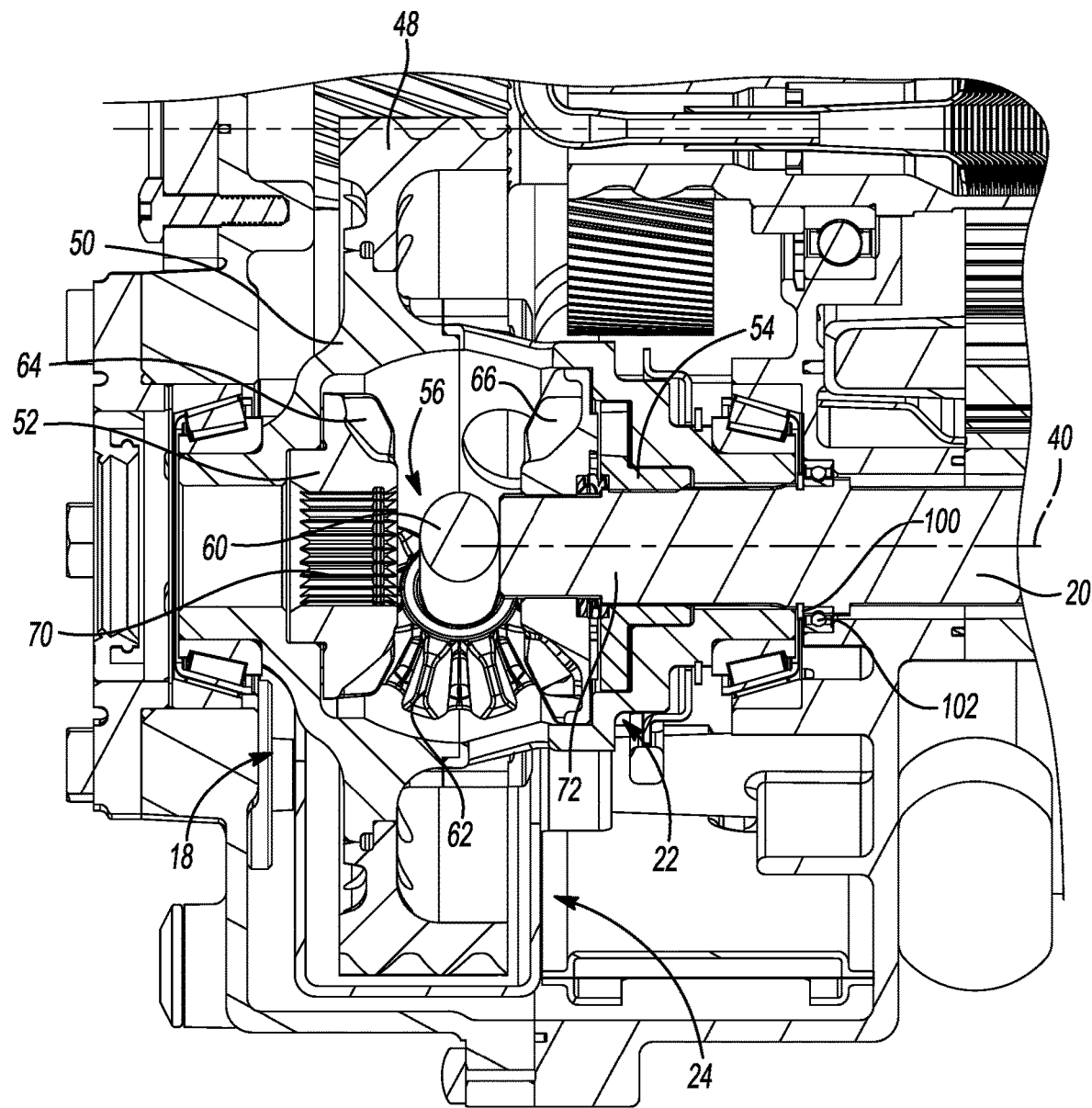
FIG. 2 is an enlarged portion of FIG. 1 illustrating a portion of a differential assembly and a disconnect mechanism in more detail.

In FIG. 2, the differential assembly 18 can include a differential input member 50, first and second differential output members 52 and 54, and a means for permitting speed differentiation between the first and second differential output members 52 and 54. Any desired speed differentiation means can be employed, such as one or more friction clutches, and/or a type of differential gearset. In the example provided, the differential input member 50 is a differential case that is coupled to the transmission output gear 48 for rotation therewith, and the means for permitting speed differentiation comprises a differential gearset 56 having a cross-pin 60, a plurality of differential pinions 62, a first side gear 64 and a second side gear 66. The cross-pin 60 is mounted to the differential input member 50 for rotation therewith about output axis 40. The cross-pin 60 is disposed perpendicular to the output axis 40. The differential pinions 62 are rotatably disposed on the cross-pin 60. Each of the first and second side gears 64 and 66 is rotatable about the output axis 40 and is meshingly engaged with the differential pinions 62. The first and second differential output members 52 and 54 are configured to transmit rotary power to a corresponding one of the axle shafts 20. In the example provided, each of the first and second differential output members 52 and 54 comprises a female splined segment 70 that non-rotatably engages a male splined segment 72 on the associated one of the axle shafts 20. The first differential output member 52 is rotatably coupled to the first side gear 64. In the example shown, the first differential output member 52 and the first side gear 64 are integrally and unitarily formed.

Figure 3:
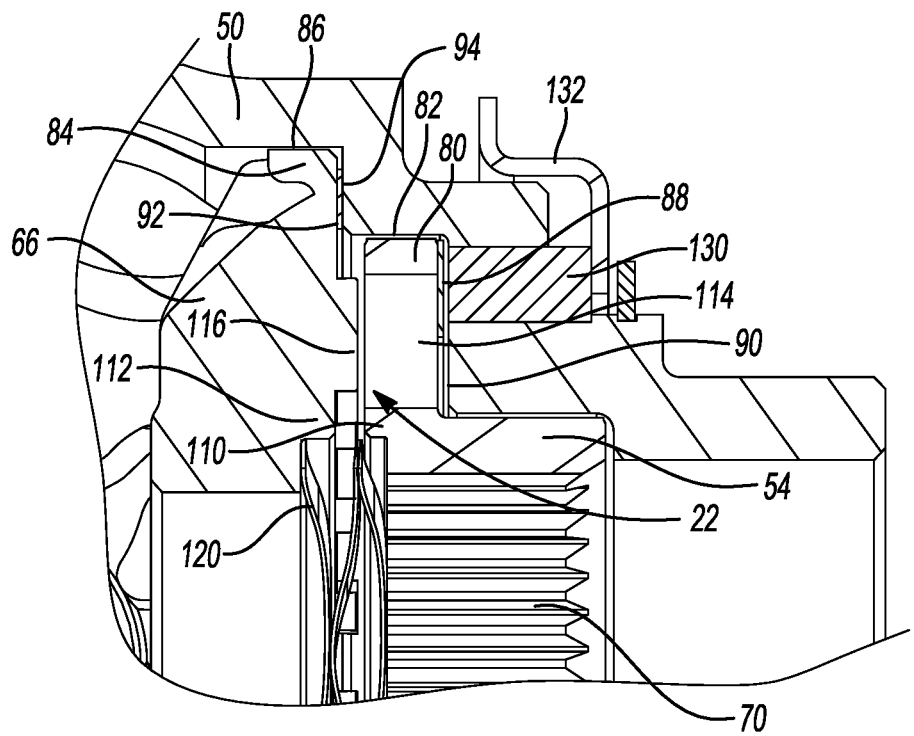
FIG. 3 is perspective section view of a portion of the electric drive unit of FIG. 1 illustrating a portion of the differential and the disconnect mechanism in more detail.

With reference to FIG. 3, the second output member 54 has an annular flange 80 that is received in a first bore 82 formed in the differential input member 50. The second side gear 66 has an annular flange 84 that is received in a second bore 86 formed in the differential input member 50. A first annular thrust member 88 can be received in the first bore 82 between an axial end of the annular flange 80 on the second differential output member 54 and a first shoulder 90 formed on the differential input member 50. A second annular thrust member 92 can be received in the second bore 86 between an axial end of the annular flange 84 on the second side gear 66 and a second shoulder 94 formed on the differential input member 50.

Returning to FIG. 2, each of the axle shafts 20 has a male-splined segment 72 that is non-rotatably engaged to a female splined segment 70 formed in an associated one of the first and second differential output members 52 and 54. A clip (not specifically shown) can be engaged to each of the axle shafts 20 on an inboard or medial facing axial end of a respective one of the first and second side gears 64 and 66. Inboard axial thrust of the axle shaft 20 that is non-rotatably coupled to the second differential output member 54 can be inhibited or limited by contact between an axial end of the axle shaft 20 and the cross-pin 60, while outboard axial thrust of the axle shaft 20 that is non-rotatably coupled to the second differential output member 54 can be inhibited or limited by snap ring 100, which can be mounted to the axle shaft 20 and which can contact a suitable bearing 100, which supports the axle shaft 20 relative to the housing 12, when the axle shaft 20 is thrust in the outboard axial direction.

Returning to FIG. 3, the disconnect mechanism 22 can comprise any means for selectively coupling the second differential output member 54 to the second side gear 66 for common rotation about the output axis 40. In the example provided, the disconnect mechanism 22 is a dog clutch having a first dog member 110, a second dog member 112, and a biasing spring 120. The first and second dog members 110 and 112 are engagable to one another to inhibit relative rotation therebetween. In the example provided, the first dog member 110 defines a plurality of circumferentially spaced apart windows or apertures 114 that are formed through the first annular flange 80 on the second differential output member 54, while the second dog member 112 defines a plurality of circumferentially spaced apart teeth 116 that are formed on the second side gear 66 and extend parallel to the output axis 40 away from the second annular flange 84. The second dog member 112 (and the second differential output member 54) are movable along the output axis 40 between a first position and a second position. Placement of the first dog member 110 in the first position locates the teeth 116 on the second dog member 112 in the apertures 114 in the first dog member 110 to thereby non-rotatably couple the first and second dog members 110 and 112 to one another. Placement of the second dog member 112 in the second position separates the teeth on the first dog member 110 from the second dog member 112 so that the first and second dog members 110 and 112 are rotationally de-coupled from one another. Accordingly, it will be appreciated that the second differential output member 54 is rotatably coupled to the second side gear 66 when the first dog member 110 is in its first position, and that the second dog member 112 is rotationally decoupled from the second side gear 66 when the first dog member 110 is in its second position. The biasing spring 120 can be configured to urge the first dog member 110 toward a desired one of its first and second positions. In the example provided, the biasing spring 120 is a wave spring and is disposed between the second differential output member 54 and the second side gear 66 and which biases the second differential output member 54 away from the second side gear 66 along the output axis 40 to thereby bias the first dog member 110 toward its second position.

Figure 4:
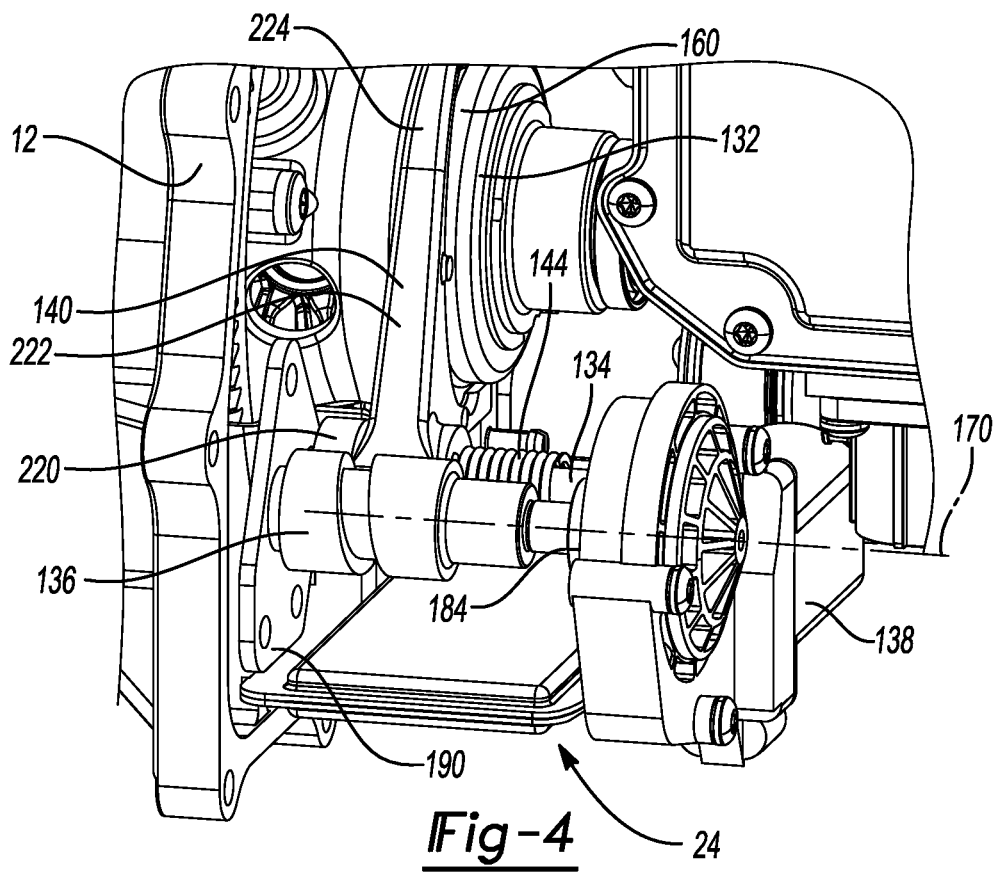
FIG. 4 is a perspective view of a portion of the electric drive unit of FIG. 1 illustrating a portion of the disconnect mechanism and a disconnect actuator in more detail.

With reference to FIGS. 3 and 4, the disconnect actuator 24 is configured to selectively move the first dog member 110 from its second position to its first position. In the particular example shown, the disconnect actuator comprises a plurality of pins 130, an actuation flange 132, an actuation shaft 134, a cam 136, an actuator motor 138, an actuation fork 140, a cam follower 142, and a compliance spring 144.

Figure 5:
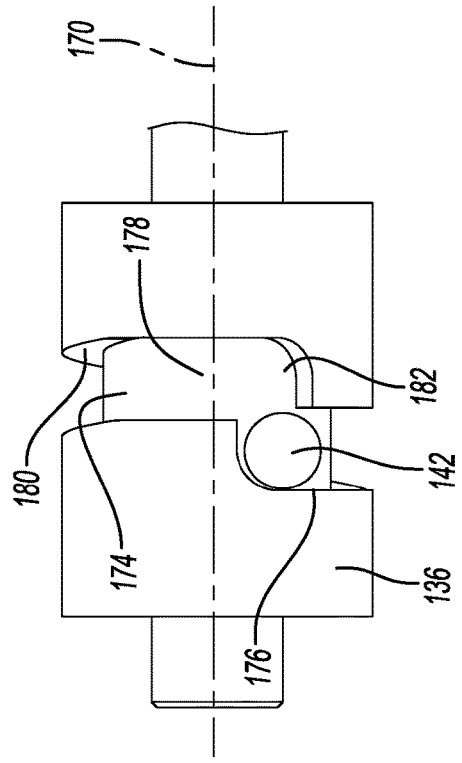
FIG. 5 is a perspective section view illustrating portions of the differential assembly, the disconnect mechanism and the disconnect actuator.

With reference to FIG. 5, the pins 130 are received into a pin apertures 150 formed through the differential input member 50. The pin apertures are formed through the first shoulder 90 on the differential input member 50 and intersect the first shoulder 90. The pins 130 can abut the first annular thrust member 88 and extend outwardly from the differential input member 50. Optionally, the pins 130 can be fixedly coupled to (e.g., unitarily and integrally formed with) the first annular thrust member 88.

The actuation flange 132 can include a tubular segment 160, a first annular flange member 162, and a second annular flange member 164. The tubular segment can be disposed concentrically about the differential input member 50. The first annular flange member 162 can be fixedly coupled to a first axial end of the tubular segment 160 and can extend radially inwardly therefrom so as to be axially in-line with ends of the pins 130 that extend outwardly from the differential input member 50. The second annular flange member 164 can be fixedly coupled to a second, opposite axial end of the tubular segment 160 and can extend radially outwardly therefrom. An external retaining ring 166 can be mounted to the differential input member 50 and can limit axial movement of the actuation flange 132 along the output axis 40 (FIG. 2) in a direction away from the second side gear 66.

Returning to FIG. 4, the actuation shaft 134 can be fixedly coupled to the housing 12 and can be disposed parallel to the output axis 40 (FIG. 2). The cam 136 is rotatable about a cam axis 170 that is parallel to the actuation shaft 134.

Figure 6:
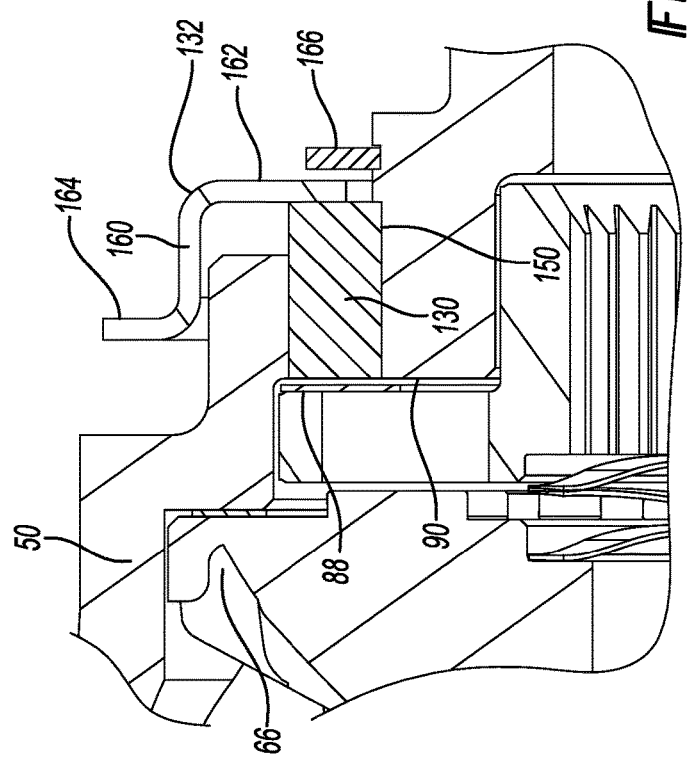
FIGS. 6, 7 and 8 are perspective views of a portion of the disconnect actuator illustrating a cam in more detail.
Figure 7:
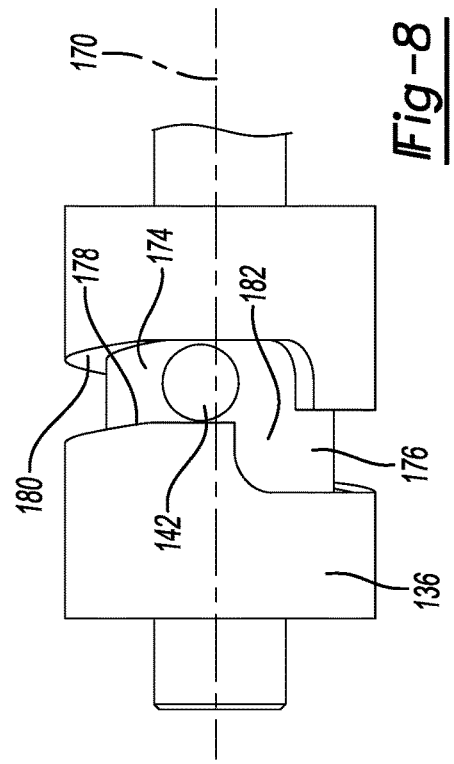
Figure 8:
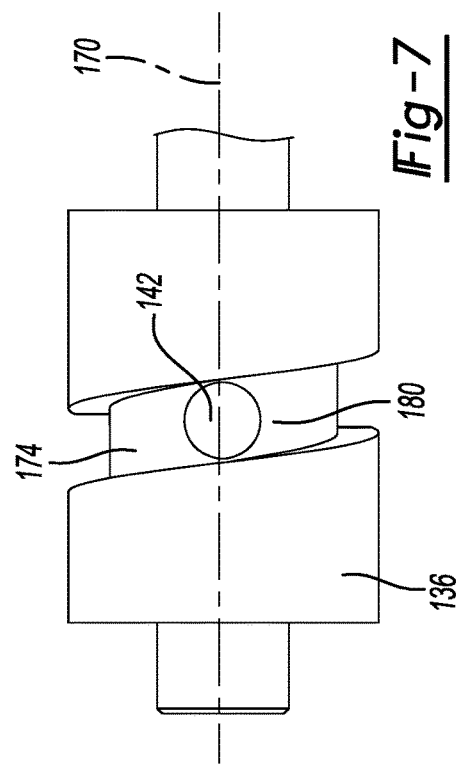

With reference to FIGS. 6 through 8, the cam 136 can be a barrel-like structure that defines a cam path 174 that extends about the circumference of the cam 136. The cam path 174 can have a first dwell portion 176, a second dwell portion 178, a first connecting portion 180 and a second connecting portion 182. The first dwell portion 176 extends around a portion of the circumference of the cam 136 and is perpendicular to the cam axis 170. The second dwell portion 178 also extends about a portion of the circumference of the cam 136 and is both perpendicular to the cam axis 170 and spaced apart along the cam axis 170 from the first dwell portion 176. The first connecting portion 180 extends circumferentially about and axially along the cam 136 to couple a first end of the first dwell portion 176 to a second end of the second dwell portion 178. The second connecting portion 182 extends axially along the cam 136 to couple a second end of the first dwell portion 176 to a first end of the second dwell portion 178.

Returning to FIG. 4, the cam 136 can be coupled to an output 184 of the actuator motor 138. The actuator motor 138 is configured to rotate the cam 136 about the cam axis 170. Optionally, the actuator motor 138 can include a rotational position sensor (not shown) that is configured to sense a rotational position of an element of the actuator motor 138 and responsively generate a rotational position signal that is employed to determine a rotational position of the cam 136.

Figure 9:
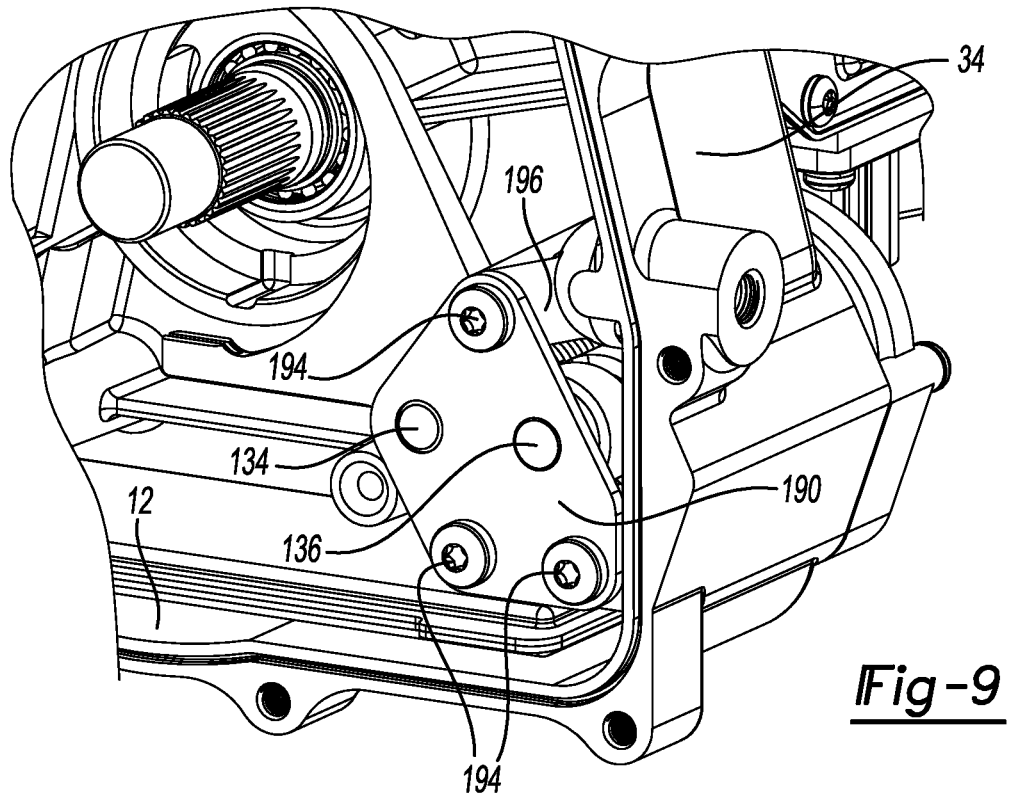
FIG. 9 is a perspective view of a portion of the electric drive unit of FIG. 1 illustrating the mounting of a portion of the disconnect actuator to a housing assembly.
Figure 10:
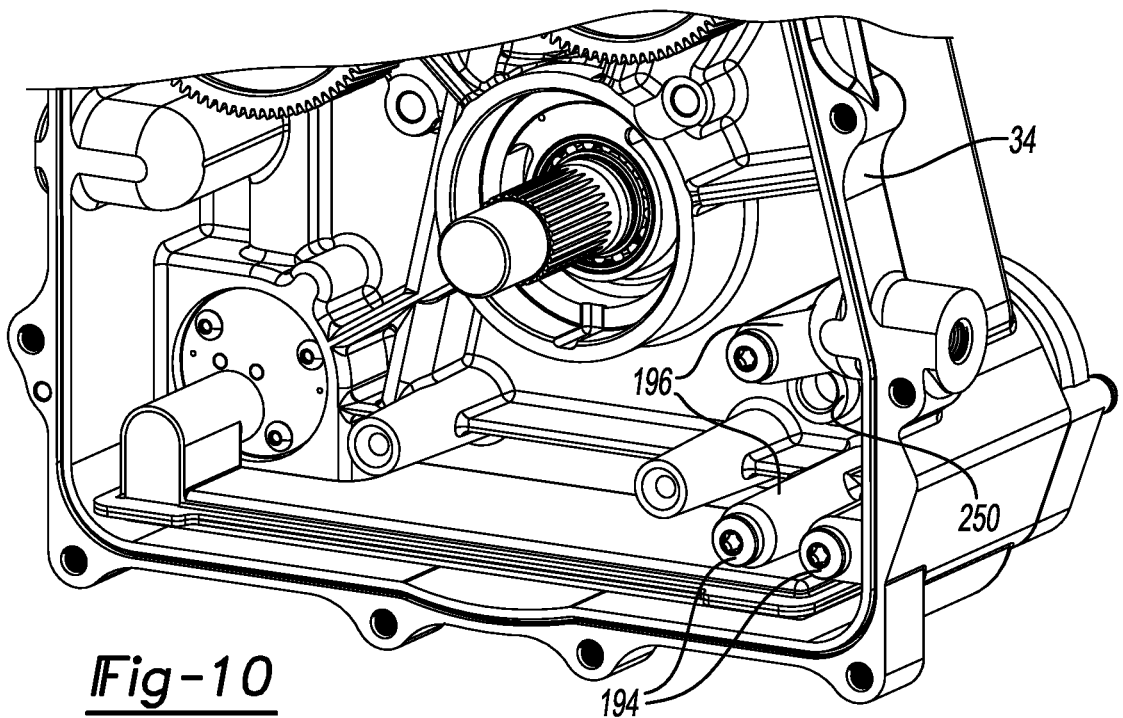
FIG. 10 is a perspective view of a portion of the electric drive unit of FIG. 1 illustrating the housing assembly in more detail.

With reference to FIGS. 4, 9 and 10, a bracket 190 is employed in the example provided to mount the actuation shaft 134 and the cam 136 to the housing 12. More specifically, a first end of the actuation shaft 134 is fixedly coupled to the bracket 190, while a first end of the cam 136 is rotatably received into the bracket 190, and the bracket 190 is mounted with threaded fasteners 194 to a plurality of bosses 196 that are formed on the second housing member 34. The bosses 196 are proximate a location where the first housing member 32 (FIG. 1) mates to the second housing member 34. The second end of the actuation shaft 134 is received into a hole (not shown) in the second housing member 34. Accordingly, the bracket 190 and the second housing member 34 cooperate to position the actuation shaft 134 within the housing 12 so that it is parallel to the output axis 40.

Figure 11:
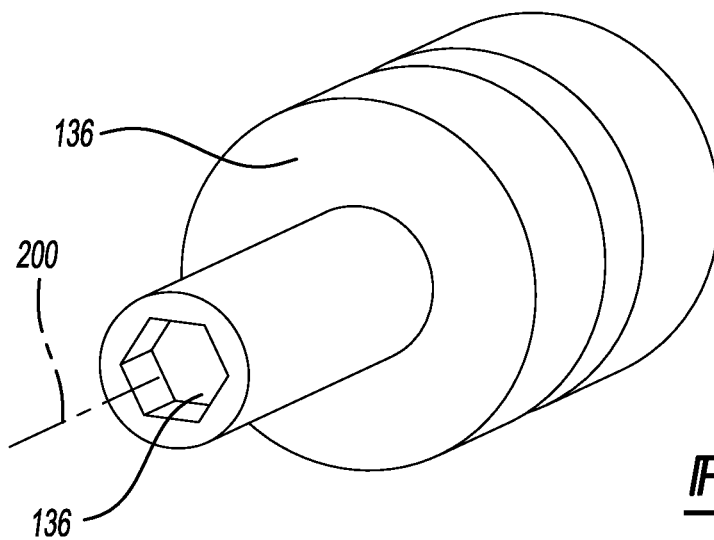
FIGS. 11 and 12 are perspective views of various portions of the disconnect actuator.
Figure 12:
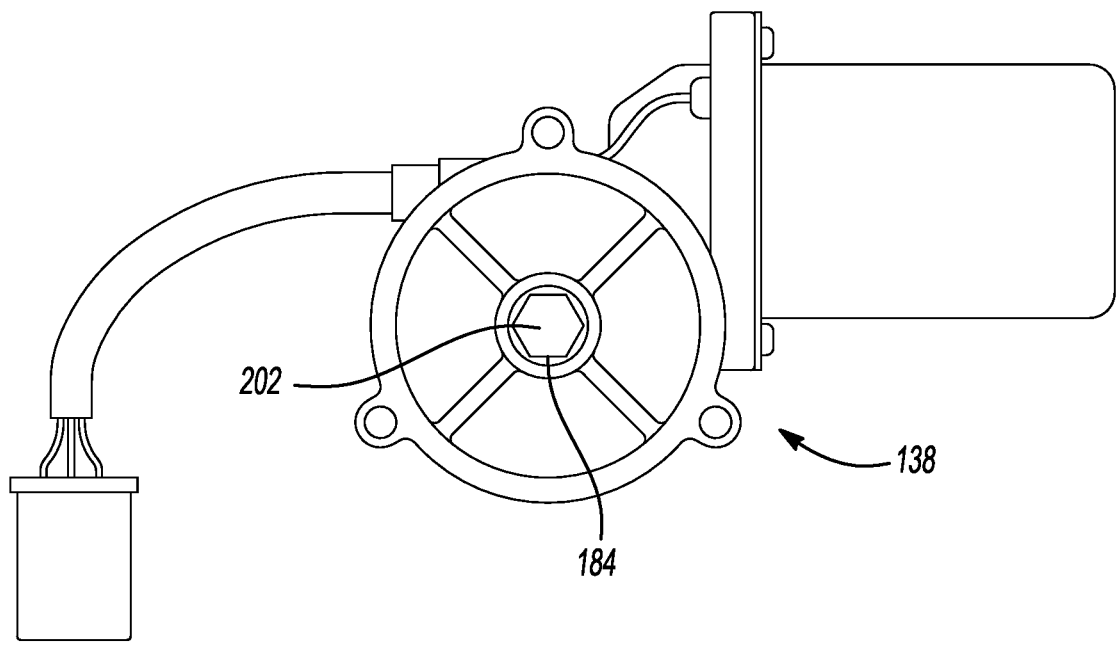

With reference to FIGS. 4, 11 and 12, the actuator motor 138 is mounted to the second housing member 34. The output 184 of the actuator motor 138 engages the end of the cam 136 that is opposite the bracket 190. The cam 136 and the output 184 can having mating drive elements, such as a female hex socket 200 that is formed in the cam 136 and a mating hex shaft 202 that is formed on the output 184. The mating drive elements can axially slidably but non-rotatably couple the cam 136 to output 184.

Returning to FIGS. 4 and 5, the actuation fork 140 includes a hub 220, which is slidably mounted on the actuation shaft 134, and a fork member 222 that is disposed about the tubular segment 160 of the actuation flange 132. The fork member 222 is generally U-shaped, having a pair of tines 224 that are abutted against the second annular flange member 164 of the actuation flange 132.

The compliance spring 144 can comprise a helical coil compression spring that can be received coaxially about the actuation shaft 134 and disposed between an interior surface 250 (FIG. 10) of the second housing member 34 (FIG. 10) and an axial end of the hub 220. The compliance spring 144 is configured to urge the actuation fork 140 along the actuation shaft 134 to cause corresponding motion of the first dog member 110 along the output axis 40 into its first position.

With reference to FIGS. 4 and 6, the cam follower 142 is fixedly coupled to the hub 220 and can extend radially outwardly from the hub 220. The cam follower 142 and is received into the cam path 174. Accordingly, axial movement of the actuation fork 140 along the actuation shaft 134 can be controlled by rotation of the cam 136.

With reference to FIGS. 4 through 8, positioning of the cam follower 142 on the first dwell portion 176 as shown in FIG. 6 permits the compliance spring 144 urge the actuation fork 140 along the actuation shaft 134 so that first dog member 110 is moved into its first position. The cam 136 can be rotated to drive the cam follower 142 from the first dwell portion 176, through the first connecting portion 180 as shown in FIG. 7 and onto the second dwell portion 178 as shown in FIG. 8 to move the actuation fork 140 along the actuation shaft 134 so that the fork member 222 is spaced apart from the second side gear 66 by a distance that is sufficient to permit the biasing spring 120 to force the first dog member 110 into its second position. It will be appreciated that movement of the first dog member 110 in this manner will cause corresponding motion of the first annular thrust member 88, the pins 130 and the actuation flange 132.

Rotation of the cam 136 from the second dwell portion 178 to the second connecting portion 182 permits the compliance spring 144 to urge the actuation fork 140 along the actuation shaft 134 to drive the first dog member 110 toward its first position. In situations where the teeth 116 on the second dog member 112 are not aligned to the apertures 114 in the first dog member 110, the compliance spring 144 essentially drives the first dog member 110 against the axial ends of the teeth 116 on the second dog member 112. The compliance spring 144 further drive the actuation fork 140 along the actuation shaft 134, as well as the actuation flange 132, the pins 130, the first annular thrust member 88 and the first dog member 110 along the output axis 40 to position the first dog member 110 into its first position when the first dog member 110 rotates somewhat relative to the second dog member 112 by an amount that is sufficient to permit the teeth 116 to be received into the apertures 114. It will also be appreciated that in a situation where the teeth 116 are aligned to the apertures 114 when the cam 136 is rotated to move the cam follower 142 from the second dwell portion 178 to the second connecting portion 182, the compliance spring 144 will drive the actuation fork 140 along the actuation shaft 134 to correspondingly drive the first dog member 110 into its first position where the teeth 116 on the second dog member 112 are received in the apertures 114 in the first dog member 110.

Figure 13:
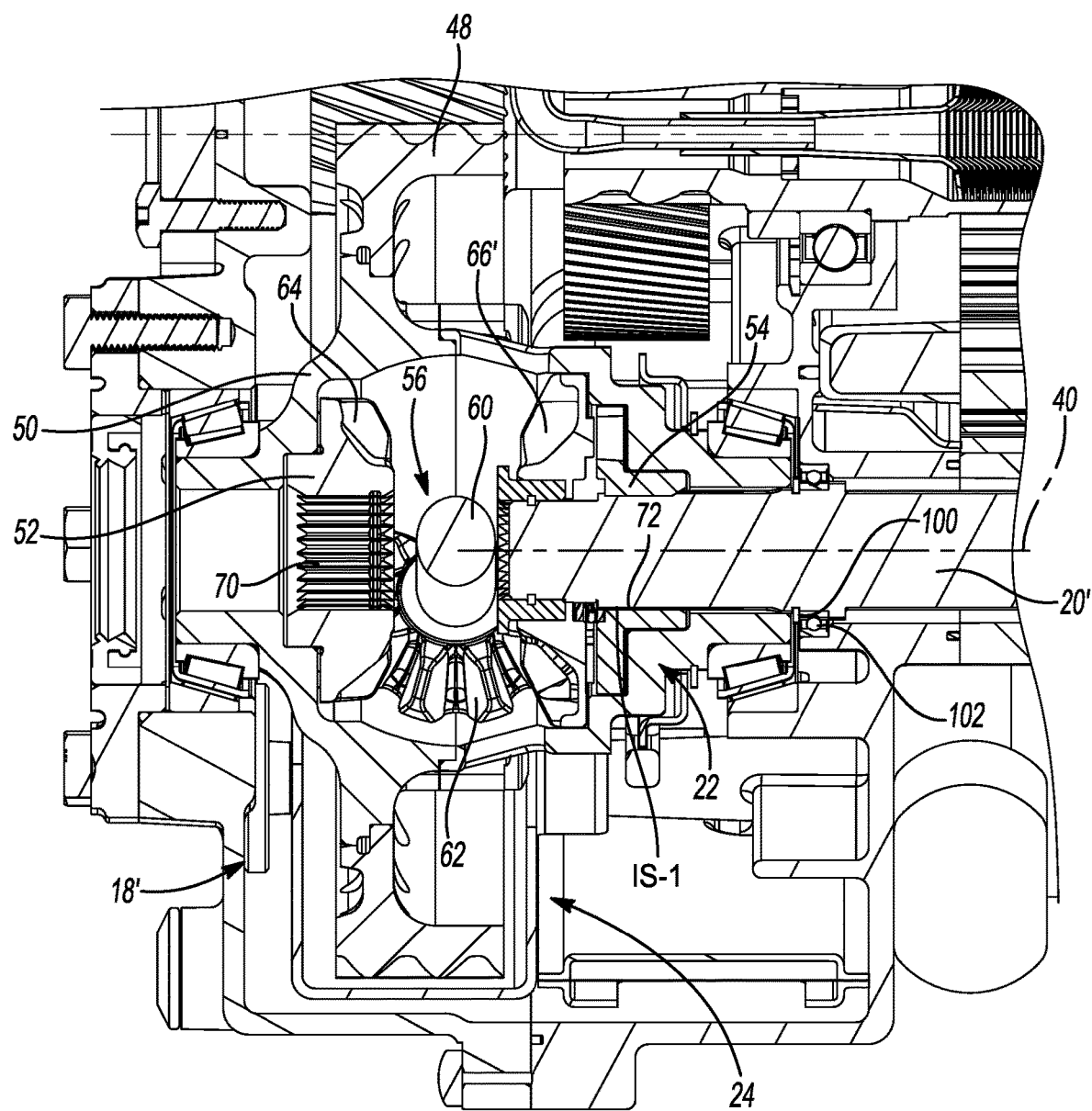
FIG. 13 is a section view of a portion of another electric drive unit constructed in accordance with the teachings of the present disclosure.
Figure 14:
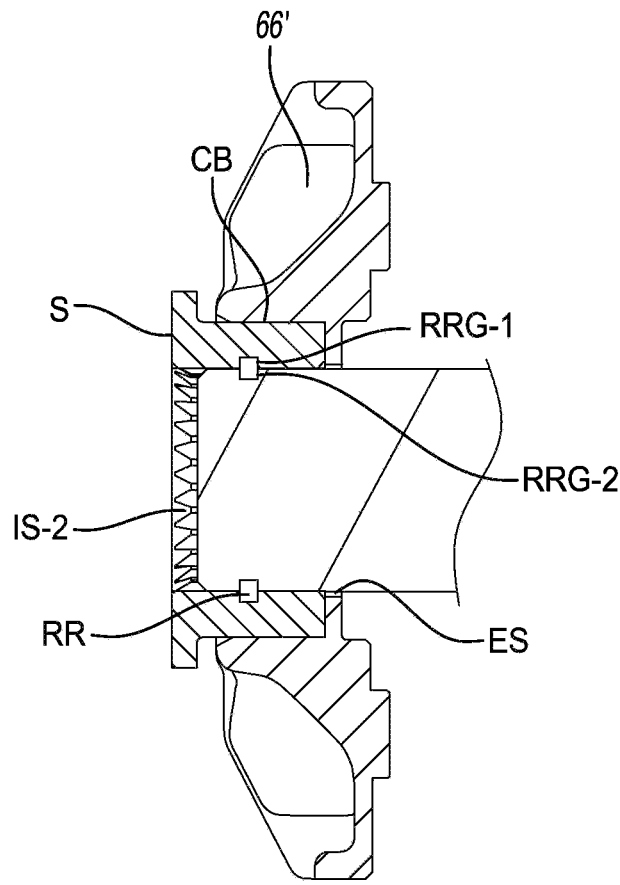
FIG. 14 is a section view of a portion of the electric drive unit of FIG. 13.
Figure 15:
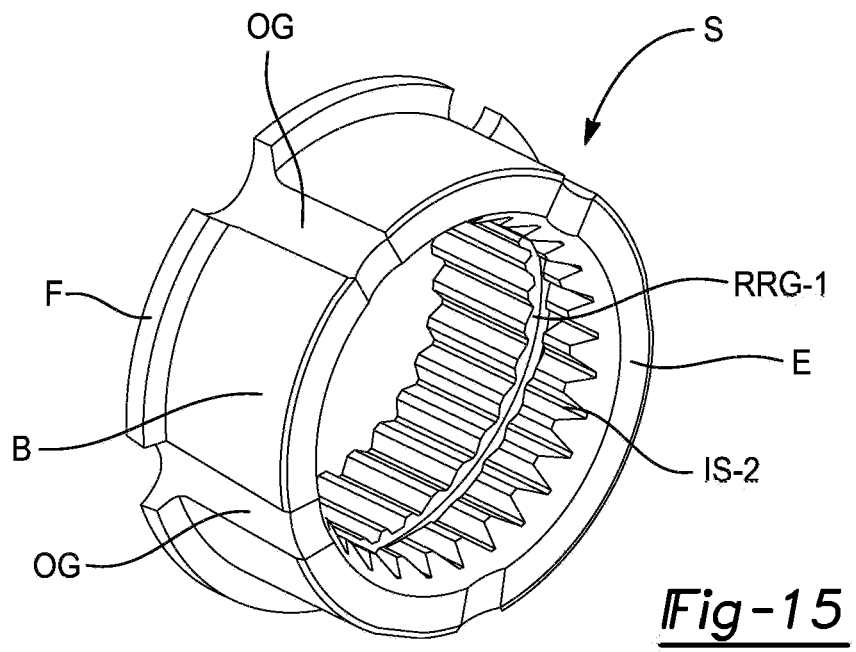
FIG. 15 is a perspective view of a portion of the electric drive unit shown in FIG. 13.

In FIG. 13, a portion of another electric drive unit constructed in accordance with the teachings of the present disclosure is illustrated. With reference to FIGS. 13 through 15, the electric drive unit can be identical to that which is described above except for the mounting of the axle shaft 20' to the second side gear 66'. More specifically, a counterbore CB is formed into the second side gear 66' on a side opposite the second differential output member 54, a sleeve S is received into the counterbore CB, the externally-splined segment ES on the axle shaft 20' is engaged to both internal splines IS-1 formed in the second differential output member 54 and internal splines IS-2 formed in the sleeve S, and a retaining ring RR is received in retaining ring grooves RRG-1 and RRG-2 formed into the sleeve S and the axle shaft 20', respectively. The configuration shown permits the axle shaft 20' to snap-fit into the sleeve S via the retaining ring RR and the retaining ring grooves RRG-1 and RRG-2 so that the axle shaft 20' is axially retained to the second side gear 66' but can be readily withdrawn from the sleeve S when needed for servicing the electric drive module. Notably, the retaining ring RR experiences no relative rotation between the axle shaft 20' and the sleeve S because the mating external and internal splines on the axle shaft 20' and the sleeve S rotatably couple the axle shaft 20' to the sleeve S. It will be appreciated that relative rotation is permitted between the sleeve S and the second side gear 66'. The sleeve S can be formed with a hollow body B and a flange F that can extend radially outwardly from a first axial end of the hollow body B. A plurality of oil grooves OG can be formed into the sleeve S. In the example provided, the oil grooves OG extend radially through the flange F, a circumferential surface of the hollow body B, and an axial end E of the hollow body B that is opposite the flange F. Splash lubrication within the differential assembly 18' can splash, fall or drain into the oil grooves and can travel in the oil grooves OG into the counterbore CB in the second side gear 66' and between the axial end E of the hollow body B and a shoulder on the second side gear 66' that is formed by the counterbore CB.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric drive unit comprising:
   a housing;
   an electric motor received in the housing, the electric motor having a motor output shaft;
   a transmission received in the housing, the transmission including a transmission input gear, which is coupled to the motor output shaft for rotation therewith, and a transmission output gear that is rotatable about an output axis;
   a differential assembly received in the housing, the differential assembly including a differential case, a differential gearset, and first and second differential output members, the differential case being coupled to the transmission output gear for rotation therewith about the output axis, the differential case defining an annular shoulder through which a plurality of circumferentially spaced-apart apertures are formed, the differential gearset having a plurality of differential pinions, which are coupled to the differential case for rotation therewith, and first and second side gears that are drivingly engaged with the differential pinions and being rotatable about the output axis relative to the differential case, the first differential output member being coupled to the first side gear for rotation therewith, the second differential output member being rotatable relative to the second side gear about the output axis, the second differential output member being movable along the output axis between a first position, in which the second differential output member is rotationally decoupled from the second side gear, and a second position in which the second differential output member is rotationally coupled to the second side gear;
   a plurality of pins, each of the pins being received in an associated one of the pin apertures such that a first axial end of each of the pins abuts the second differential output member and a second, opposite axial end of each of the pins extends outwardly of the differential case from the annular shoulder;
   a first axle shaft coupled for rotation with the first differential output member;
   a second axle shaft coupled for rotation with the second differential output member;
   an actuation flange received onto the differential case, the actuation flange having a first annular flange member that abuts the second axial ends of the pins; and
   an actuator that is configured to move the actuation flange along the output axis, the actuator having an actuator fork that engages the actuation flange.

2. The electric drive unit of claim 1, wherein a biasing spring urges the second differential output member in a predetermined direction along the output axis.

3. The electric drive unit of claim 2, wherein the biasing spring biases the second differential output member toward the first position.

4. The electric drive unit of claim 1, wherein a first dog member is fixedly coupled to the second side gear, wherein a second dog member is fixedly coupled to the second differential output member, and wherein the first and second dog members form a dog clutch.

5. The electric drive unit of claim 1, wherein the actuation fork is slidably mounted on an actuation shaft that is parallel to the output axis.

6. The electric drive unit of claim 5, wherein the actuator further comprises a rotatable cam, wherein the cam defines a cam path that is formed about a circumference of the cam, and wherein a cam follower is mounted to the actuation fork and is received in the cam path such that rotation of the cam causes corresponding axial movement of the actuation fork.

7. The electric drive unit of claim 6, wherein the cam path includes a first dwell portion, a second dwell portion and a first connecting portion that extends between the first and second dwell portions, wherein the second differential output member is disposed in the first position when the cam follower is disposed in one of the first and second dwell portions, and wherein the second differential output member is disposed in the second position when the cam follower is disposed in the other one of the first and second dwell portions.

8. The electric drive unit of claim 7, wherein the cam path includes a second connecting portion that connects the first and second dwell portions to one another on sides of the first and second dwell portions that are opposite a side on which the first connecting portion connects the first and second dwell portions.

9. The electric drive unit of claim 6, wherein the actuator further comprises a rotary motor that is drivingly coupled to the cam.

10. The electric drive unit of claim 9, further comprising a bracket that is removably coupled to the housing, wherein the bracket supports the actuation shaft and the cam for rotation relative to the housing.

11. The electric drive unit of claim 1, further comprising a sleeve and a retaining ring, the sleeve being rotatable relative to the second side gear and being coupled to the second axle shaft for rotation therewith, the retaining ring being disposed between the sleeve and the second axle shaft and being configured to inhibit axial movement of the second axle shaft relative to the sleeve.

12. The electric drive unit of claim 11, wherein the sleeve is received into a counterbore formed in the second side gear.

13. The electric drive unit of claim 11, wherein a plurality of oil grooves are formed into the sleeve, the oil grooves being configured to direct lubrication on the sleeve toward an area where the sleeve contacts the second side gear.

* * * * *